United States Patent
MucFaden et al.

(10) Patent No.: US 7,257,624 B2
(45) Date of Patent: Aug. 14, 2007

(54) SYSTEM FOR STORING ACTIVE AND INACTIVE CONFIGURATION COMMANDS AT A NETWORK NODE FOR MANAGING ITS CONFIGURATION STATE

(75) Inventors: Michael R. MucFaden, San Jose, CA (US); Shiva Shenoy, San Jose, CA (US)

(73) Assignee: Lucent Technologies Inc., Murray Hill, NJ (US)

( * ) Notice: Subject to any disclaimer, the term of this patent is extended or adjusted under 35 U.S.C. 154(b) by 819 days.

(21) Appl. No.: 10/454,102

(22) Filed: Jun. 4, 2003

(65) Prior Publication Data
US 2003/0225782 A1 Dec. 4, 2003

Related U.S. Application Data

(60) Provisional application No. 60/385,987, filed on Jun. 4, 2002.

(51) Int. Cl.
*G06F 15/177* (2006.01)
(52) U.S. Cl. .................................. 709/220; 709/221
(58) Field of Classification Search ................ 709/220, 709/221, 203, 223; 370/254, 357; 718/1; 714/10
See application file for complete search history.

(56) References Cited

U.S. PATENT DOCUMENTS

| | | | | |
|---|---|---|---|---|
| 5,487,149 A | * | 1/1996 | Sung ........................... | 714/10 |
| 5,819,061 A | * | 10/1998 | Glassen et al. ................ | 718/1 |
| 6,167,431 A | * | 12/2000 | Gillies et al. ............... | 709/203 |
| 2002/0021675 A1 | * | 2/2002 | Feldmann .................... | 370/254 |
| 2002/0052941 A1 | * | 5/2002 | Patterson .................... | 709/223 |
| 2002/0126659 A1 | * | 9/2002 | Liu et al. .................... | 370/357 |

* cited by examiner

*Primary Examiner*—Le Hien Luu (57) ABSTRACT

A network node maintains an inactive config file of unsuccessfully executed configuration commands. The network node maintains an active config file of active executed configuration commands. In response to a change of conditions that invalidates an active configuration command, the network node moves data from the active config file to the inactive config file. In response to a change of conditions, the network node re-executes inactive commands and moves data from the inactive config file to the active config file if an inactive configuration command is successfully re-executed.

20 Claims, 5 Drawing Sheets

SYSTEM FOR STORING ACTIVE AND INACTIVE CONFIGURATION COMMANDS AT A NETWORK NODE FOR MANAGING ITS CONFIGURATION STATE

CROSS REFERENCE TO RELATED APPLICATION

This application is entitled to the benefit of provisional Patent Application Ser. No. 60/385,987, filed Jun. 4, 2002.

FIELD OF THE INVENTION

The invention relates to network management, and more particularly, to managing a configuration state generated using configuration commands at a network node in a packet-based network.

BACKGROUND OF THE INVENTION

A packet-based network includes multiple nodes that are coupled together to facilitate the forwarding of traffic from one node to some subset of the other nodes. Nodes that intelligently forward traffic between these nodes are often referred to as routers, bridges, or switches. Lookups are performed frequently in the process of handling network traffic. In a lookup, information from incoming packets, such as header information, is used to compare against information stored in a lookup table to determine how the packet should be handled. In the process of handling network traffic, a lookup may entail using information from one or more protocol layers. The International Standards Organization (ISO) defines the layers in the Open System Interconnection (OSI) model.

A router must typically be configured before routing packets. Configuring a router typically entails entering a set of configuration commands and waiting for the router to execute the commands. Configuration commands may include, for example, commands to set a hostname (e.g., "hostname name") and commands to set bandwidth (e.g., "bandwidth 128"). Several proprietary configuration command sets are used. The syntax of any given command depends upon the proprietary configuration command set used for a particular router. The configuration commands may be entered one-by-one using a graphical user interface (GUI) or in a batch using a text file that is received at the router via a data interface. When a configuration command is successfully executed (i.e., is accepted by the router), data associated with the configuration command is loaded into a running configuration ("config") file on the router. The running config file includes each active configuration command. The router may or may not provide feedback related to the successful execution of configuration commands, but routers typically have "show config" commands that allow an administrator to check the contents of the running config file.

When a configuration command is unsuccessfully executed at a router, the configuration command is discarded. An administrator is typically informed of the failure of the configuration command through a craft interface or an error log that is output from the router. An administrator may find it difficult to figure out which commands failed due to the limited amount of information that may be derived from a craft interface and incomplete error logs. Nevertheless, in part due to the limited resources, comprehensive configuration tools are typically not available on a router. Accordingly, if there is a change of conditions at the router that would result in successful execution of a configuration command that previously failed, the administrator may not be aware of the change. And even if the administrator consults the error logs or otherwise becomes aware of the change of conditions, the administrator must reenter the configuration command, or commands.

In view of the need to respond to changes in conditions at a router, what is needed is a technique for managing configuration state within a network switch.

SUMMARY OF THE INVENTION

Configuration of a network node, such as a switch/router, involves maintaining configuration state at the network node. A method for configuring a network node, according to an embodiment of the invention, includes receiving a set of configuration commands at the network switch, executing the set of configuration commands, storing successfully executed configuration commands such that the successfully executed configuration commands are identifiable as active configuration commands, and storing unsuccessfully executed configuration commands such that the unsuccessfully executed configuration commands are identifiable as inactive configuration commands. Storing the unsuccessfully executed configuration commands is advantageous because it allows re-execution of a configuration command that was identifiable as an inactive configuration command on demand or when conditions change. The risk of incorrectly re-entering the configuration command is lower, the difficult task of checking an error log to determine which configuration commands should be reentered is potentially eliminated, and, if desired, an entire error log may be regenerated on demand for only the unsuccessfully executed commands. Moreover, it is not necessary to parse compound configuration commands to determine which portion of a configuration command was unsuccessfully executed when re-executing an unsuccessfully executed portion of a compound configuration command.

A computer program product according to an embodiment of the invention includes computer code for executing a set of configuration commands, storing successfully executed configuration commands such that the successfully executed configuration commands are identifiable as active configuration commands, and storing unsuccessfully executed configuration commands such that the unsuccessfully executed configuration commands are identifiable as inactive configuration commands.

A system according to an embodiment of the invention includes memory for storing files and applications, a processor configured to execute applications stored in the memory, and an input interface configured to receive configuration commands. The memory is for storing an active configuration (config) file, an inactive config file, and an execution (exec) application. The exec application is configured to execute a set of configuration commands received on the input interface, place data associated with successfully executed configuration commands in the active config file, and place data associated with unsuccessfully executed configuration commands in the inactive config file.

Other aspects and advantages of the present invention will become apparent from the following detailed description, taken in conjunction with the accompanying drawings, illustrating by way of example the principles of the invention.

DETAILED DESCRIPTION OF THE INVENTION

Figure 1:
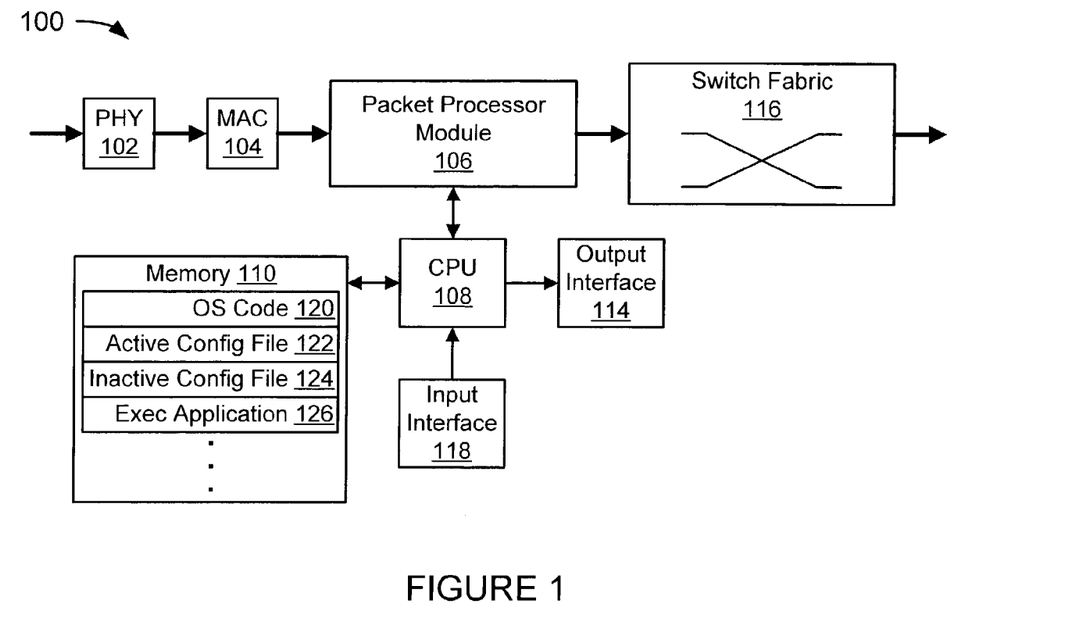
FIG. 1 depicts relevant functional blocks of a network node that forwards packets within a network.

FIG. 1 depicts relevant functional blocks of a network node 100, such as a switch, a router, or a switch/router, that forwards packets within a network. The network node 100 includes a PHY 102, a MAC 104, a packet processor 106, a central processing unit (CPU) 108, memory 110, an output interface 114, a switch fabric 116, an input interface 118. In an embodiment, the network node is an Ethernet-based switch/router.

The PHY 102 is the physical interface between the incoming signals and the network node. In an embodiment that includes an optical connection, the PHY converts incoming light pulses into electrical signals and then identifies the incoming data segments, for example, incoming Ethernet frames. The PHY forwards the incoming data segments to the MAC 104. The PHY is a well-known functional unit in switches and routers and is not described in further detail.

The MAC 104 manages the layer 2 addressing control for the network nodes. For bridged data segments (i.e., Ethernet frames), the MAC reads the layer 2 header of incoming data segments and may perform layer 2 lookups to determine how to forward the incoming data segments to their next destination within the network node. For routed data segments (i.e., IP packets), the MAC forwards the data segments to the packet processor module 106.

The packet processor module 106 performs layer 3 address lookups for routed data segments (i.e., IP packets). In an embodiment, the packet processor module may also perform layer 2 forwarding functions. The packet processor module includes a lookup table (not shown). As shown in FIG. 1, the packet processor module is in communication with the CPU 108.

The switch fabric 116 creates a datapath between the packet processor module 106 and an output packet processor (not shown). Switch fabrics that are utilized with Ethernet switch/routers are known in the field and may include shared memory, shared bus, and cross point matrices. Packets could be forwarded using switching, bridging, or any combination of routing, switching, and bridging. The packets described herein need not be limited to any one layer of the OSI model.

The CPU 108 is a multifunction processor that performs various management functions. In an embodiment, the PHY 102, MAC 104, packet processor module 106, CPU 108, memory 110, output interface 114, and input interface 118 are located on the same line card and the CPU handles control functions on the line card. The CPU implements software instructions. Software instructions that are implemented by the CPU may be stored in the memory.

The memory 110 includes operating system (OS) code 120, an active configuration (config) file 122, an inactive config file 124, and an execution (exec) application 126. The memory may include, for example, electrically erasable programmable read-only memory (EEPROM), flash, or read-only memory (ROM) for storing operational code and, for example, dynamic RAM (DRAM) for buffering traffic and storing data structures. In an embodiment, the active config file and the inactive config file are stored in flash memory. The OS manages applications stored in memory. OSs are well known in the art of computer science and are not discussed in further detail herein.

The network node 100 receives configuration commands through the input interface 118. In an embodiment, the configuration commands are received as a batch in a text file. In this embodiment, the files could be copied using a command, such as copy text-file running-config to copy the batch of configuration commands in a file, "text-file," to a running-config file, "running-config," on the network node 100. Alternatively, the files could be copied over using a sequence of commands, such as copy file scratchpad copy scratchpad running-config to copy the batch of configuration commands to a scratchpad, "scratchpad," then copy the configuration commands from the scratchpad to a running-config file, "running-config," on the network node 100. In another embodiment, the input interface includes a graphical user interface (GUI). An alternative of this other embodiment involves a human entering configuration commands with an input device, such as a keyboard. In any case, the exec application 126 executes the configuration commands. If a configuration command contains a syntax error, the configuration command is rejected. The output interface 114 transmits data related to the execution of the configuration command for display on a remote device or includes a hardware diagnostic display, such as a craft interface.

Figure 2:
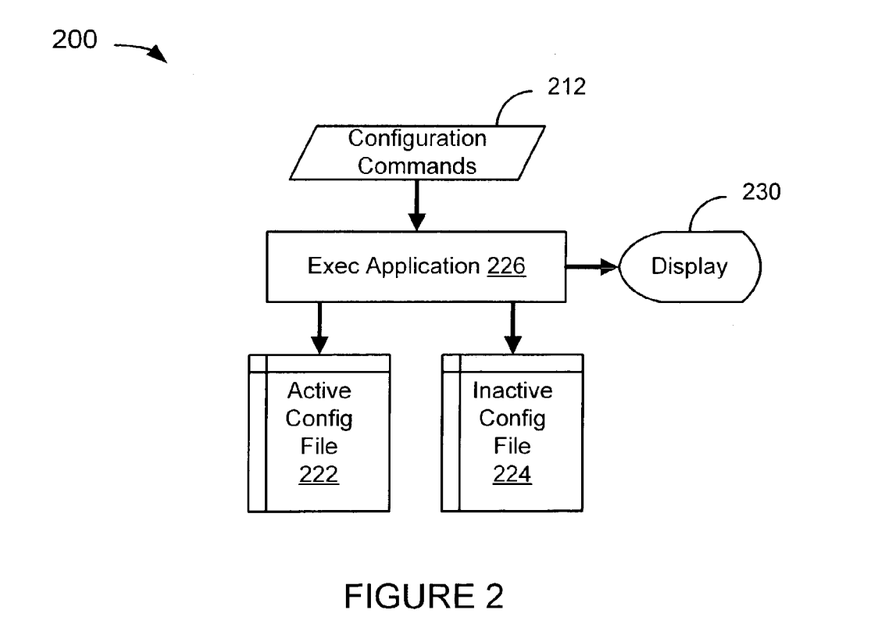
FIG. 2 is a logical representation of relevant functional blocks of FIG. 1.

FIG. 2 is a logical representation 200 of relevant functional blocks of FIG. 1 that are used when executing configuration commands. FIG. 2 is intended to illustrate the execution of configuration commands and subsequent storage of data related to the configuration commands. The data is stored separately according to an embodiment of the invention. In an alternative embodiment, the configuration commands are not stored separately, but are distinctly identifiable as active or inactive. An advantage of storing configuration commands separately or such that the configuration commands are identifiable as active or inactive is that a network node can use the distinct files to maintain a configuration state (hereinafter, simply referred to as "state"), as described later.

The logical representation 200 includes configuration commands 212, an exec application 226, an active config file 222, an inactive config file 224, and a display 230. The configuration commands are received by the exec application. The exec application executes the received configuration commands. In an embodiment, the exec application executes the configuration commands one at a time in the order received (or in the order they are presented in a text file, if applicable). If the exec application successfully executes a configuration command, then the exec application stores data associated with the successfully executed configuration command in the active config file. If the exec application does not successfully execute a configuration command, then the exec application stores data associated with the unsuccessfully executed configuration command in the inactive config file. The inactive config file may also be referred to as an "errored" config file because it contains config commands that resulted in an error during execution. The exec application may provide output for a diagnostic display following each attempted execution of a configuration command and/or after each configuration command of a batch of configuration commands have been executed.

Referring once again to FIG. 1, each successfully executed configuration command has an effect on the state of the network node 100. In accordance with an embodiment of the invention, if conditions change due to, for example, a change in the bandwidth available to the network node 100, and a first configuration command is no longer valid due to the change in conditions, the exec application 126 moves data associated with the first configuration command from the active config file 122 to the inactive config file 124. The exec application may also move data associated with a second configuration command from the inactive config file to the active config file when a change in conditions validates a previously invalid configuration command. In this way, in an embodiment, the exec application maintains state.

The data stored in the active config file 122 is associated with the current state maintained by the exec application 126. Accordingly, the active config file can be said to define a current, or active, state. Moreover, assuming no additional configuration commands are received, the state at the network node 100 can be defined by the received set of configuration commands if the exec application successfully executes each of the configuration commands, none of the configuration commands if the exec application unsuccessfully executes all of the configuration commands, or a non-empty subset of the configuration commands if the exec application successfully executes one or more but not all of the configuration commands.

Figure 3:
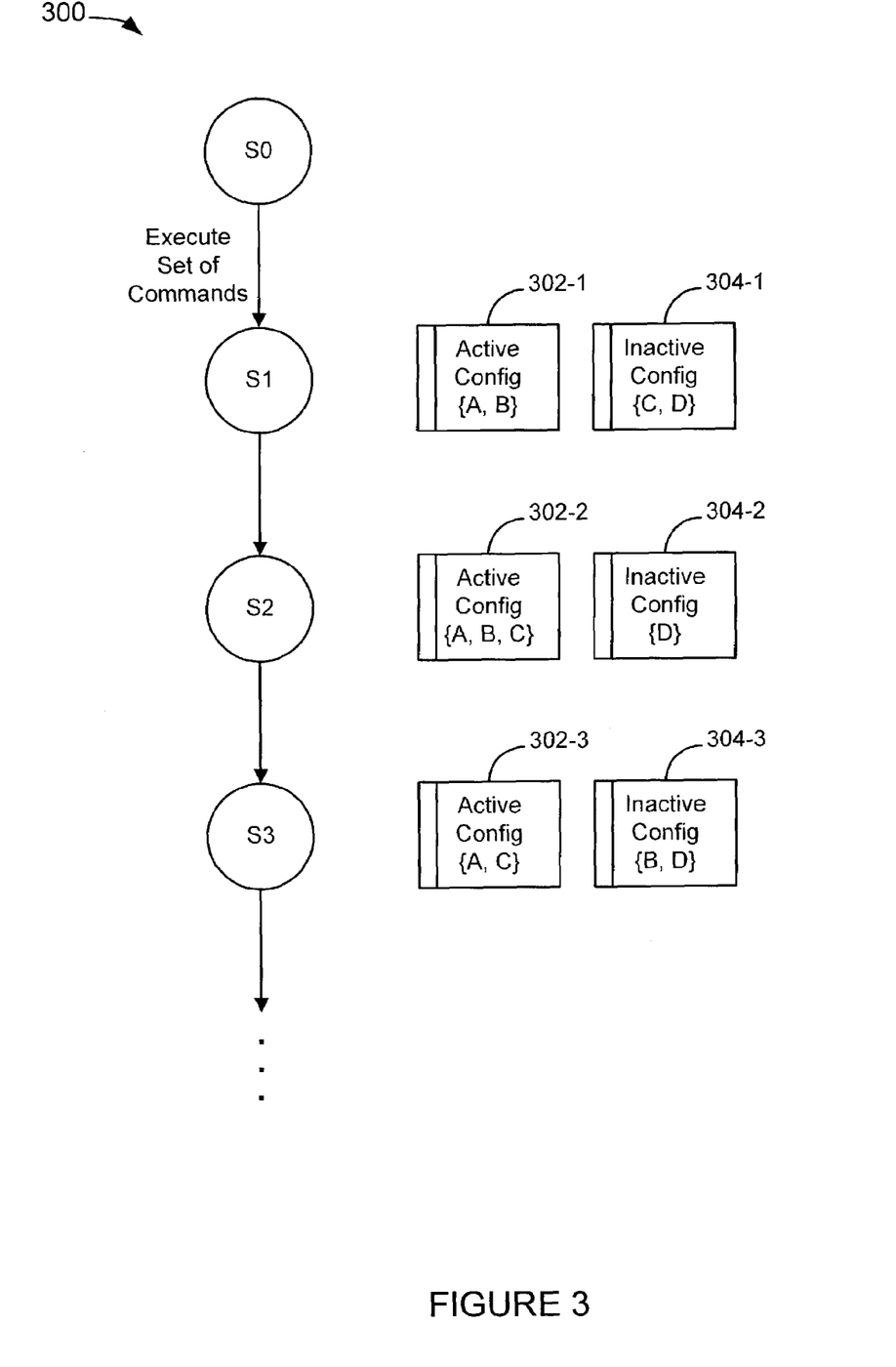
FIG. 3 depicts an exemplary state diagram annotated with exemplary file contents.

FIG. 3 depicts an exemplary state diagram 300 annotated with exemplary file contents to help illustrate changes in state over time. The exemplary file contents are for an active config file 302-1 to 302-3 (referred to collectively as the active config file 302) and an inactive config file 304-1 to 304-3 (referred to collectively as the inactive config file 304). It should be noted that for the active config file and the inactive config file, the "−1" to "−3" suffix is an indication of the state. For example, the active config file 302-1 is the active config file 302 for state S1. The state diagram 300 begins at a starting state S0. In this example, the set of configuration commands is {A, B, C, D}. {A}, {B}, {C}, and {D} are subsets of the set of configuration commands. For the purposes of this example, configuration commands in the set of configuration commands have not been executed prior to S0.

When configuration commands are executed, the state transitions from S0 to S1. The successfully executed configuration commands are stored in an active config file 302-1 and unsuccessfully executed configuration commands are stored in an inactive config file 304-1. At state S1, the active config file 302-1 includes the subset {A, B} of the configuration commands and the inactive config file 304-1 includes the subset {C, D} of the configuration commands.

State transitions from S1 to S2 when conditions change. Exemplary changed conditions are discussed later. For the purposes of FIG. 3, a generic changed condition is sufficient to illustrate corresponding changes in state over time. In this example, the changed condition calls for moving data associated with a configuration command (e.g., command C), or a portion thereof, from the inactive config file 304 to the active config file 302. In the embodiment of FIG. 3, this entails successfully re-executing the inactive configuration command C. Accordingly, at state $S_2$, the active config file 302-2 includes {A, B, C} and the inactive config file 304-2 includes {D}. This is possible only because the unsuccessfully executed configuration commands are stored according to an embodiment of the invention. Since data is moved from the inactive config file to the active config file, it can be surmised that a previously unsuccessfully executed configuration command (i.e., a previously invalid command) is now valid.

State transitions from S2 to S3 when conditions change again. In this example, the changed condition calls for moving data associated with a configuration command (e.g., command B), or a portion thereof, from the active config file 302 to the inactive config file 304. Accordingly, at state $S_3$, the active config file 302-3 includes {A, C} and the inactive config file 304-3 includes {B, D}. Since data is moved from the active config file to the inactive config file, it can be surmised that a previously successfully executed configuration command (i.e., a previously valid command) is now invalid.

Figure 4:
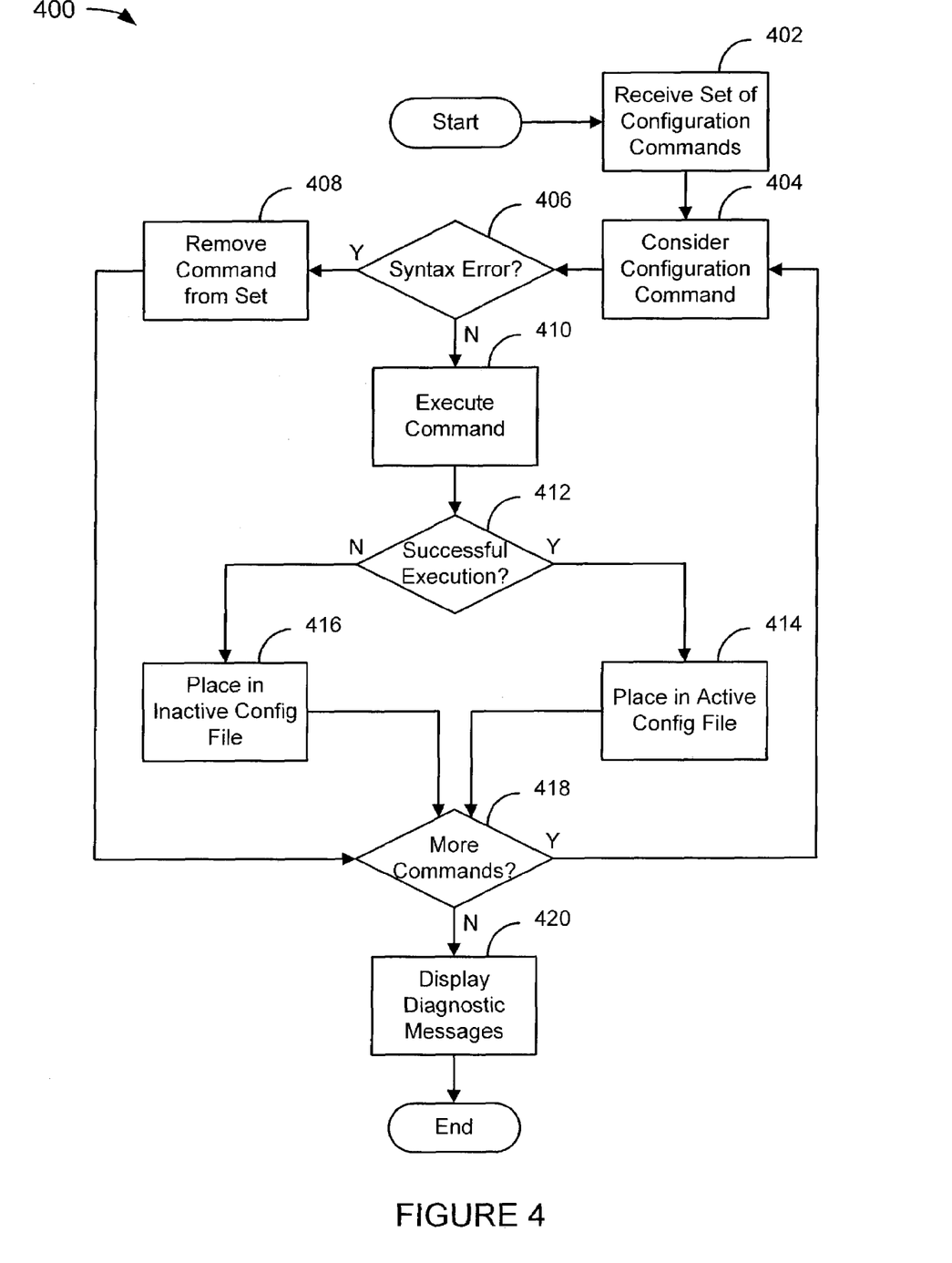
FIGS. 4, 5, 6A, 6B, and 6C depict flowcharts of methods according to an embodiment of the invention.

FIG. 4 is a flowchart 400 of a method according to the invention. The flowchart 400 is intended to illustrate how configuration commands are sorted into active config and inactive config files. For the purposes of flowchart 400, compound configuration commands (not shown) are treated as multiple atomic configuration commands. The flowchart 400 starts at step 402 with receiving a set of configuration commands. At step 404, a first one of the configuration commands is considered by, for example, an exec application. At decision point 406, it is determined whether the configuration command has a syntax error. If so (406-Y), then at step 408 the configuration command is removed from the set of configuration commands. If not (406-N), then the command is executed at step 410. It should be noted that syntactically incorrect configuration commands are not "unsuccessfully executed" because they are not executed.

At decision point 412, it is determined whether the command was successfully executed. If so (412-Y), data associated with the configuration command is placed in the active config file at step 414. In an embodiment, the data includes the configuration command itself. If not (412-N), data associated with the configuration command is placed in the inactive config file at step 416. Again, in an embodiment, the data includes the configuration command itself. The storage of inactive configuration commands is advantageous because it enables viewing of inactive config commands on demand in response to, for example, a "show" command. In this way, it is possible to determine at any time which of the set of configuration commands have failed. Moreover, it is possible to re-execute the inactive configuration commands without having to re-enter the commands.

After step 408, 414, or 416, it is determined at decision point 418 whether there are more configuration commands in the set of configuration commands received at step 402 to consider. If so (418-Y), a next configuration command is considered at step 404 and the flowchart 400 continues as described previously. If not (418-N), diagnostic messages are displayed at step 420 and the flowchart 400 ends. In an embodiment, data related to the execution of configuration commands is compiled for display at step 420. In another embodiment, a message is displayed after a configuration command is executed.

Referring once again to FIG. 1, in an embodiment, the exec application 126 provides a summary of diagnostic data associated with the executed configuration commands to the output interface 114. The diagnostic data includes information associated with configuration commands that were unsuccessfully executed. In an alternative, the diagnostic display includes an indication of how many configuration commands were successfully executed and how many configuration commands were unsuccessfully executed. In another alternative, the diagnostic display includes a marker symbol indicating a line wherein a configuration command was unsuccessfully executed and the code associated with the line. The marker symbol assists in the identification of errors where a summary of the number of successfully executed and unsuccessfully executed configuration commands would be of limited value. For example, in some cases, configuration commands are received as lines of code (e.g., in a text file). A single line could include a plurality of configuration commands or one or more compound configuration commands. A compound configuration command includes multiple components and is treated by the exec application 126 as a set of commands, rather than just a single command. Accordingly, a line of code may include a compound configuration command that is treated as if it is a plurality of configuration commands. Marker symbols are used to mark a line as successfully executed, unsuccessfully executed, or partially executed. In another alternative, the diagnostic display includes a detailed explanation of a reason why configuration commands were unsuccessfully executed. In an embodiment, configuration, marker symbols, and diagnostic descriptions are configured for storage in a text file format for output from the node 100.

In an alternative embodiment, a craft interface displays the status of configuration commands. The node 100 may include LED lights configured to indicate successful execution of the set of configuration commands if each configuration command is successfully executed, indicate partial execution of the set of configuration commands if a first configuration command is successfully executed and a second configuration command is unsuccessfully executed, and indicate failed execution of the set of configuration commands if each configuration command is unsuccessfully executed.

With each of these diagnostic display alternatives, because unsuccessfully executed configuration commands are stored, diagnostic or other messages can be regenerated on demand. Since the unsuccessful portion of a compound command is also stored in the inactive config file 124, it is not necessary to parse compound configuration commands to determine which portion of a configuration command was unsuccessfully executed when re-executing configuration commands in the inactive config file. Moreover, storing unsuccessfully executed configuration commands eliminates the need to re-enter the set of configuration commands, without increasing the risk of error inherent in analyzing a diagnostic display, and to reenter unsuccessfully executed configuration commands.

Figure 5:
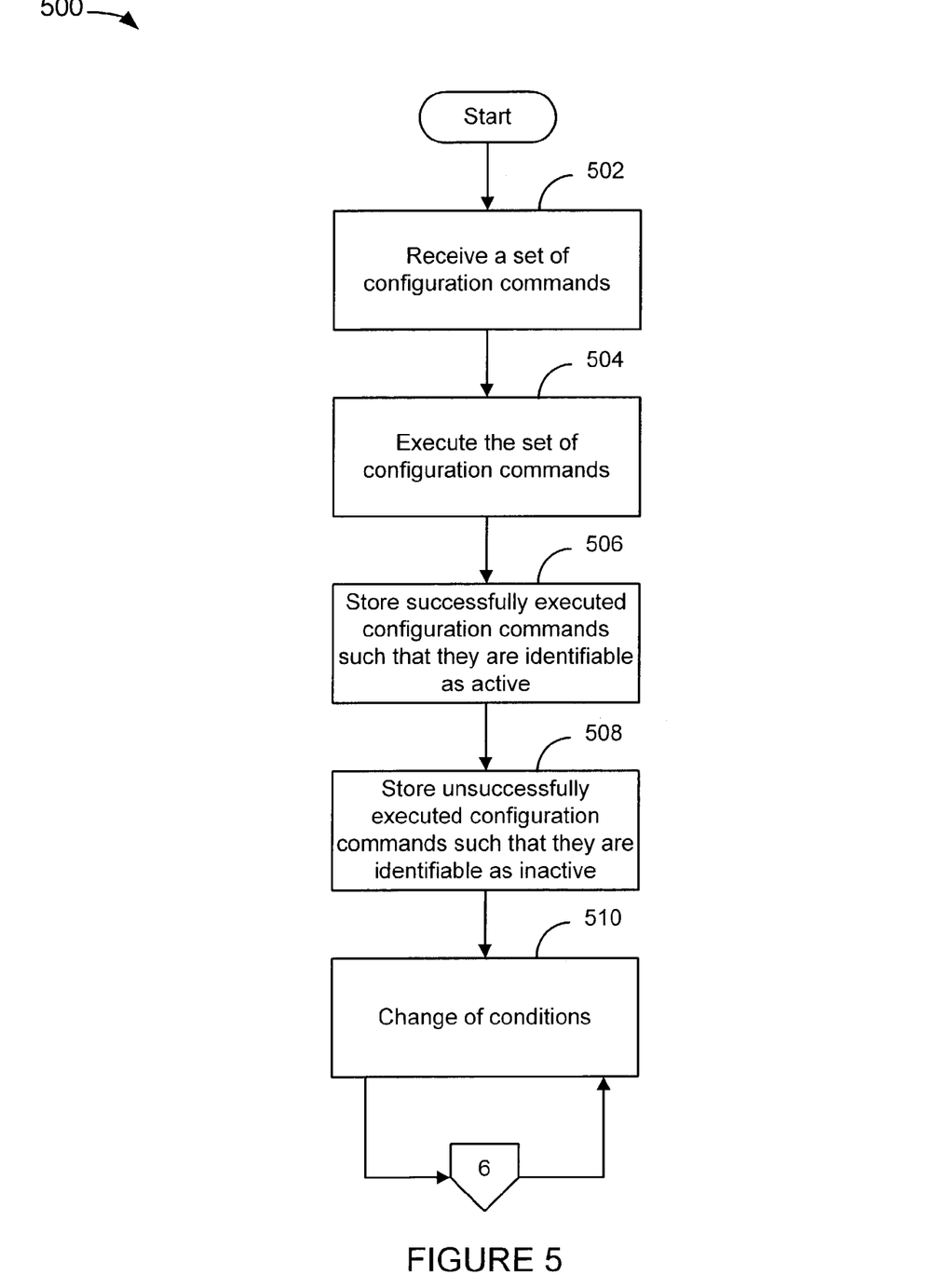

FIG. 5 depicts a flowchart 500 of a method according to an embodiment of the invention. The flowchart 500 is intended to illustrate the establishment of state followed by subsequent changes of conditions that may result in state transitions. The flowchart 500 begins at step 502 with receiving a set of configuration commands. At step 504, the set of configuration commands is executed. At step 506 successfully executed configuration commands are stored such that they are identifiable as active configuration commands. At step 508, unsuccessfully executed configuration commands are stored such that they are identifiable as inactive configuration commands. At step 510, conditions change. Exemplary responses to a change of conditions are described with reference to FIGS. 6A-6C.

Figure 6A:
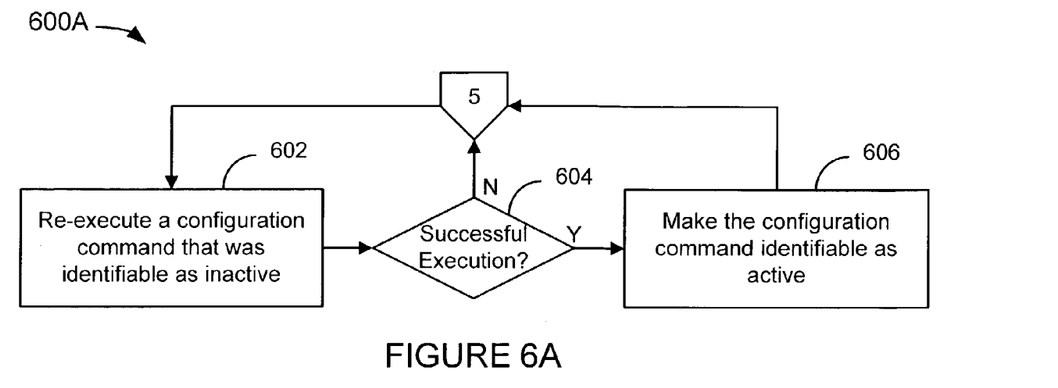

FIGS. 6A, 6B, and 6C illustrate exemplary responses to a change of conditions to a network node that maintains state according to an embodiment of the invention. FIG. 6A depicts a flowchart 600A of a response to a change of conditions that calls for re-execution of an inactive configuration command. The change of conditions could be determined from, for example, a timer such that inactive configuration commands are re-executed periodically, an input that calls for re-execution of inactive configuration commands, an increase or decrease in available resources, or some other change in conditions. The flowchart 600A starts at step 602 with re-executing a configuration command that was identifiable as inactive. At decision point 604, it is determined whether re-execution is successful. If re-execution is not successful, the flowchart 600A returns to step 510 (FIG. 5). Otherwise, if the re-execution is successful, the configuration command is made identifiable as an active configuration command at step 606 and the flowchart 600A returns to step 510 (FIG. 5). Making the configuration command identifiable as an active configuration command may entail, for example, changing a field associated with the configuration command, moving the configuration command from a database or file associated with inactive configuration commands to a database or file associated with active configuration commands, or using some other mechanism that serves to identify a previously inactive configuration command as active.

Figure 6B:
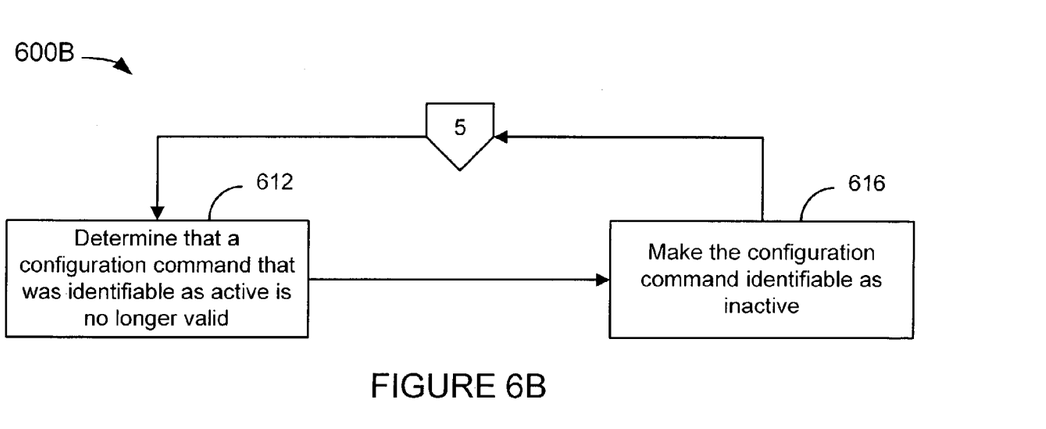

FIG. 6B depicts a flowchart 600B of a response to a changed condition that calls for deactivation, or invalidation, of an active configuration command. The changed condition could be determined from, for example, an input that indicates an active configuration command is no longer valid, an increase or decrease in available resources, or some other changed condition. The flowchart 600B starts at step 612 with determining from the changed condition that the configuration command that was identifiable as active is no longer valid. At step 616 the configuration command is made identifiable as inactive and the flowchart 600B returns to step 510 (FIG. 5). Making the configuration command identifiable as an inactive configuration command may entail, for example, changing a field associated with the configuration command, moving the configuration command from a database or file associated with active configuration commands to a database or file associated with inactive configuration commands, or using some other mechanism that serves to identify a previously active configuration command as inactive.

Figure 6C:
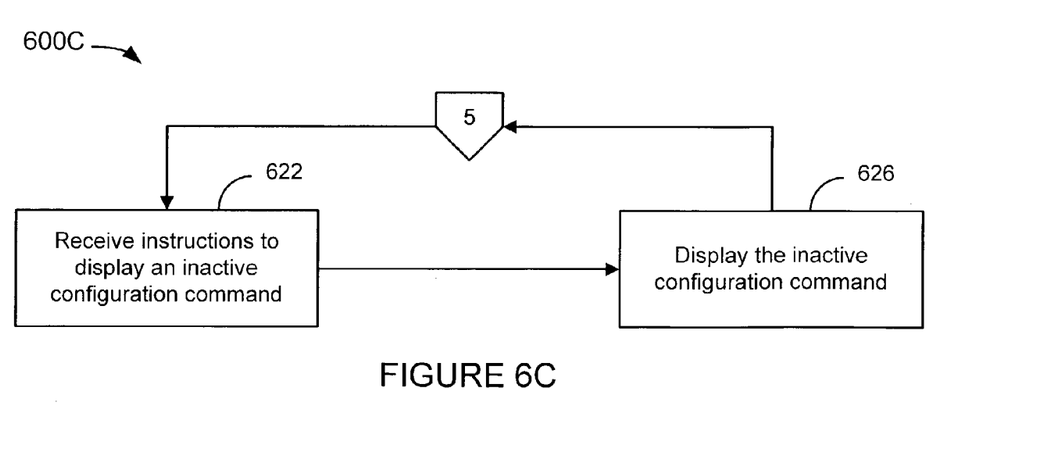

FIG. 6C depicts a flowchart 600C of a response to a changed condition that calls for display of an inactive configuration command. The changed condition could be determined from, for example, an input that indicates the inactive configuration commands are to be displayed, an increase or decrease in available resources, or some other changed condition. The flowchart 600C starts at step 622 with receiving instructions to display an inactive configuration command. At step 626 the inactive configuration command is displayed and the flowchart 600C returns to step 510 (FIG. 5). Displaying the configuration command may entail, for example, displaying the inactive configuration commands; displaying a summary of diagnostic data associated with executed configuration commands; displaying how many configuration commands were successfully executed and how many configuration commands were unsuccessfully executed; displaying marker symbols indicating a line wherein a configuration command was unsuccessfully executed and code associated with the line; displaying an explanation of why unsuccessfully executed configuration commands were unsuccessfully executed; displaying diagnostic information configured for use with a plurality of LED lights configured to indicate successful execution of the set of configuration commands if each configuration command is successfully executed, indicate partial execution of the set of configuration commands if a first configuration command is successfully executed and a second configuration command is unsuccessfully executed, and indicate failed execution of the set of configuration commands if each configuration command is unsuccessfully executed; and displaying diagnostic information configured for display with a craft interface.

It shall be appreciated that not all methods steps described must be performed, nor must they be performed in the order stated.

Although specific embodiments of the invention have been described and illustrated, the invention is not to be limited to the specific forms or arrangements of parts as described and illustrated herein. The invention is limited only by the claims

What is claimed is:

1. A method for managing configuration state within a network node, comprising:
   receiving a set of configuration commands at the network node;
   executing the set of configuration commands at the network node;
   storing successfully executed configuration commands such that the successfully executed configuration commands are identifiable as active configuration commands; and
   storing unsuccessfully executed configuration commands such that the unsuccessfully executed configuration commands are identifiable as inactive configuration commands.

2. The method of claim 1, further comprising: re-executing a configuration command that was identifiable as an inactive configuration command.

3. The method of claim 2, wherein said configuration command is successfully re-executed, further comprising: making the configuration command identifiable as an active configuration command.

4. The method of claim 2, wherein said re-executing further comprises:
   storing the configuration command such that the configuration command is identifiable as an active configuration command.

5. The method of claim 1, farther comprising:
   determining that a configuration command that was identifiable as an active configuration command is no longer valid due to a change in conditions; and
   making the configuration command identifiable as an inactive configuration command.

6. The method of claim 5, wherein said making further comprises: storing the configuration command such that the configuration command is identifiable as an inactive configuration command.

7. The method of claim 1, further comprising:
   receiving instructions to display an inactive configuration command; and
   displaying the inactive configuration command.

8. A computer readable medium containing executable instructions for maintaining state at a network switch, the executable instructions comprising computer code for:
   executing a set of configuration commands at the network switch;
   storing successfully executed configuration commands such that the successfully executed configuration commands are identifiable as active configuration commands; and
   storing unsuccessfully executed configuration commands such that the unsuccessfully executed configuration commands are identifiable as inactive configuration commands.

9. The computer readable medium of claim 8, further comprising computer code for: re-executing a configuration command that was identifiable as an inactive configuration command.

10. The computer readable medium of claim 9, wherein said configuration command is successfully re-executed, further comprising computer code for: making the configuration command identifiable as an active configuration command.

11. The computer readable medium of claim 9, wherein said re-executing further comprises: storing the configuration command such that the configuration command is identifiable as an active configuration command.

12. The computer readable medium of claim 8, further comprising computer code for:
    determining that a configuration command that was identifiable as an active configuration command is no longer valid due to a change in conditions; and
    making the configuration command identifiable as an inactive configuration command.

13. The computer readable medium of claim 12, wherein said making further comprises: storing the configuration command such that the configuration command is identifiable as an inactive configuration command.

14. A packet-based traffic forwarding system, comprising:
    memory for storing files and applications;
    a processor configured to execute applications stored in the memory; and
    an input interface configured to receive configuration commands, wherein said memory is for storing:
    an active config file;
    an inactive config file:
    an exec application configured to:
      execute a Bet of configuration commands received on said input interface;
      place data associated with successfully executed configuration commands in the active config file, wherein the active config file defines a first state; and
      place data associated with unsuccessfully executed configuration co in the inactive config file.

15. The system of claim 14 wherein said exec application is further configured to:
    move data associated with a configuration command from the inactive config file to the active config file in response to a change in conditions, wherein following said move the active config file defines a second state.

16. The system of claim 14 wherein said exec application is further configured to:
    move data associated with a configuration command from the active config file to the inactive config file in response to a change in conditions, wherein following said move the active config file defines a second state.

17. The system of claim 14, further comprising:
    an output interface, wherein said exec application is further configured to:
    receive, on the input interface, instructions to display an inactive configuration command:

output data associated with the inactive configuration command on the output interface.

18. The system of claim 14, further comprising:
an output interface, wherein said exec application is further configured to:
provide diagnostic data associated with the executed configuration commands on the output interface.

19. The system of claim 18, wherein said diagnostic data includes one or more displays from the set of displays comprising:
a summary of diagnostic data associated with the executed configuration commands;
an indication of how many configuration commands were successfully executed and how many configuration commands were unsuccessfully executed;
symbols indicating a line wherein a configuration command was unsuccessfully executed and code associated with the line, wherein said set of configuration commands are received as lines of code and each line of code includes one or more configuration commands;
an explanation of why unsuccessfully executed configuration commands were unsuccessfully executed;
diagnostic information configured for use with a plurality of LED lights configured to:
indicate successful execution of the set of configuration commands if each configuration command is successfully executed,
indicate partial execution of the set of configuration commands if a first configuration command is successfully executed and a second configuration command is unsuccessfully executed, and
indicate failed execution of the set of configuration commands if each configuration command is unsuccessfully executed; and
diagnostic information configured for display wit a craft interface.

20. The system of claim 19, wherein said diagnostic data is configured for storage in a text file format.

* * * * *